No. 826,494. PATENTED JULY 17, 1906.
J. P. DURKIN.
CONTROLLER REGULATOR.
APPLICATION FILED NOV. 20, 1905.
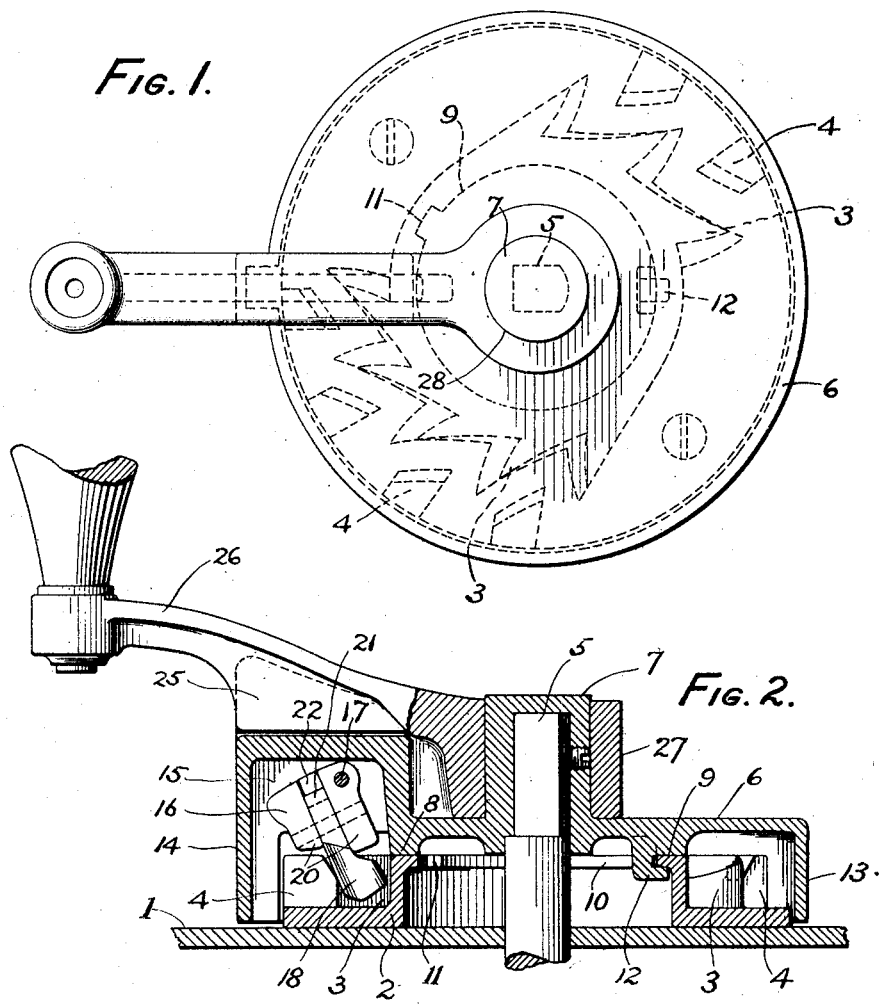
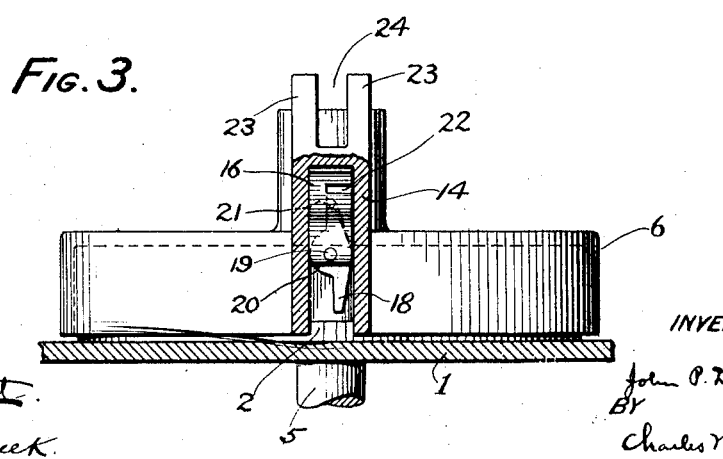
WITNESSES:
Rob‘ R Kitchel
Louis H. Buck.
INVENTOR
John P. Durkin
BY
Charles N. Butler
ATTORNEY.

UNITED STATES PATENT OFFICE.

JOHN P. DURKIN, OF PHILADELPHIA, PENNSYLVANIA, ASSIGNOR TO DURKIN CONTROLLER HANDLE COMPANY, OF PHILADELPHIA, PENNSYLVANIA, A CORPORATION OF PENNSYLVANIA.

CONTROLLER-REGULATOR.

No. 826,494.  Specification of Letters Patent.  Patented July 17, 1906.

Application filed November 20, 1905. Serial No. 288,132.

*To all whom it may concern:*

Be it known that I, JOHN P. DURKIN, a citizen of the United States, residing at Philadelphia, in the county of Philadelphia and State of Pennsylvania, have invented certain Improvements in Controller-Regulators, of which the following is a specification.

This invention is an improvement on the controller-regulating mechanism described in the patent granted to me December 27, 1904, and it is particularly designed to provide improved means for protecting the mechanism from the weather, for preventing tampering or other interference therewith, and for connecting the operating-handle.

In the accompanying drawings, Figure 1 is a plan view of the invention with interior parts shown by dotted lines. Fig. 2 is a vertical sectional view thereof, and Fig. 3 is a side elevation of the same with parts broken away.

As shown in the drawings, the top 1 of the controller-casing has fixed thereon the ring 2, provided with the circularly-disposed serrations 3 and stops 4.

The controller-shaft 5, revoluble in the top of the casing and extending above the ring, has fixed thereon a hood 6, provided with a cylindrical dome 7, which completely covers the shaft, and a bearing 8, which rides upon the bearing 9 of the ring 2, a flange 10 within the ring having therein a notch 11, which receives a lug 12, depending from the hood, to engage the flange and to hold the hood and ring together in revoluble relation and inseparable, excepting when the lug registers with the notch. Extending above the general level of the hood, beyond the peripheral flange 13 thereof, is a housing 14, providing an angular recess 15.

A coupling 16 is pivotally connected to the hood, so as to pendulate radially with reference thereto, by a pin 17, passing through the housing and the coupling, and a dog 18 is pivotally connected to the coupling, so as to pendulate transversely to the movement thereof, by the pin 19, passing through the dog and the coupling's bifurcations 20, the dog swinging backward freely and having its oscillating movement in the opposite direction limited by a lug 21, acting in a recess 22 and making contact with the body of the coupling. Extending upward from the housing 14 are the lugs or bifurcations 23, having the socket 24 between them, by which the web or lug 25, depending from the handle 26, is engaged, the shoe 27 of the handle having the cylindrical socket 28 therein for receiving the dome 7. There is thus provided in combination with the controller a hood which completely covers the controller-shaft, the dog having its articulated connection in the housing and the zigzag way with which the dog coacts.

Having described my invention, I claim—

1. In a controller, in combination with the controller-shaft and means for regulating its movement, a hood for covering said regulating means, said hood being fixed to and covering said shaft.

2. In a controller, in combination with the controller-shaft, a hood fixed to and covering said shaft, and a handle engaged to said hood and revolving said shaft therethrough.

3. In a controller, in combination with a controller-shaft, a hood fixed to said shaft, and a handle engaged to said hood.

4. In a controller, in combination with a controller-shaft, a hood fixed to said shaft, said hood having a socket, and a handle with a lug thereon engaging the socket of said hood.

5. In a controller, in combination with a controller-shaft, a hood having lugs thereon fixed to said shaft and a handle with means thereon fitting between said lugs.

6. In a controller, in combination with a controller-shaft and a handle, a hood having a circular dome thereon engaging said shaft and a socket engaged by said handle.

7. In a controller, a stationary zigzag way, a hood having a housing revolving over said way, a dog coacting with said way, and a connection for said dog in said housing.

8. In a controller, in combination with the controller-shaft, a hood fixed to said shaft and a housing thereon, a stationary zigzag way, and a dog connected to said housing by an articulation permitting it to pendulate in transverse directions, said dog pendulating in said way to effect a step-by-step forward movement and tilting transversely to disengage said way in the backward movement.

9. A controller having alternating inclined ways and stops, a hood thereon, and a dog having a jointed connection with said hood permitting it to pendulate in transverse directions.

10. In a controller-regulator, in combination with the controller-shaft and casing, a bearing supported by said casing, and a hood connected to said shaft, said hood having a bearing which rides on the bearing supported by said casing.

11. In a controller-regulator, in combination with the controller-shaft and casing, a ring having a flange thereon supported by said casing, and a hood having a lug thereon connected to said shaft, said lug engaging said flange.

In testimony whereof I have hereunto set my hand, this 17th day of November, 1905, in the presence of the subscribing witnesses.

JOHN P. DURKIN.

Witnesses:
UTLEY E. CRANE, Jr.
LOUIS H. BUCK.